US009774974B2

(12) United States Patent
Yoo et al.

(10) Patent No.: US 9,774,974 B2
(45) Date of Patent: Sep. 26, 2017

(54) AUDIO METADATA PROVIDING APPARATUS AND METHOD, AND MULTICHANNEL AUDIO DATA PLAYBACK APPARATUS AND METHOD TO SUPPORT DYNAMIC FORMAT CONVERSION

(71) Applicants: Electronics and Telecommunications Research Institute, Daejeon (KR); Kyonggi University Industry & Academia Cooperation Foundation, Suwon-si (KR)

(72) Inventors: Jae Hyoun Yoo, Daejeon (KR); Tae Jin Lee, Daejeon (KR); Seok Jin Lee, Seoul (KR)

(73) Assignees: Electronics and Telecommunications Research Institute, Daejeon (KR); Kyonggi University Industry & Academia Cooperation Foundation, Suwon-si (KR)

( * ) Notice: Subject to any disclaimer, the term of this patent is extended or adjusted under 35 U.S.C. 154(b) by 0 days.

(21) Appl. No.: 14/851,913

(22) Filed: Sep. 11, 2015

(65) Prior Publication Data

US 2016/0088416 A1 Mar. 24, 2016

(30) Foreign Application Priority Data

Sep. 24, 2014 (KR) ........................ 10-2014-0127751
Apr. 28, 2015 (KR) ........................ 10-2015-0059445

(51) Int. Cl.
*H04S 3/02* (2006.01)
*H04S 3/00* (2006.01)
(Continued)

(52) U.S. Cl.
CPC .............. *H04S 3/02* (2013.01); *G10L 19/173* (2013.01); *H04S 3/008* (2013.01); *G10L 19/008* (2013.01);
(Continued)

(58) Field of Classification Search
CPC ............... H04S 3/02; H04S 3/002; H04S 7/30
(Continued)

(56) References Cited

U.S. PATENT DOCUMENTS 5,649,052 A * 7/1997 Kim ....................... H04B 1/665 704/226
6,088,351 A * 7/2000 Jenkin ................ H04B 7/18523 370/347

(Continued)

*Primary Examiner* — Gerald Gauthier
(74) *Attorney, Agent, or Firm* — NSIP Law

(57) ABSTRACT

An audio metadata providing apparatus and method and a multichannel audio data playback apparatus and method to support a dynamic format conversion are provided. Dynamic format conversion information may include information about a plurality of format conversion schemes that are used to convert a first format set by an author of multichannel audio data into a second format that is based on a playback environment of the multichannel audio data and that are each set for corresponding playback periods of the multichannel audio data. The audio metadata providing apparatus may provide audio metadata including the dynamic format conversion information. The multichannel audio data playback apparatus may identify the dynamic format conversion information from the audio metadata, may convert the first format of the multichannel audio data into the second format based on the identified dynamic format conversion information, and may play back the multichannel audio data in the second format.

17 Claims, 7 Drawing Sheets

(51) Int. Cl.
*G10L 19/16* (2013.01)
*G10L 19/008* (2013.01)

(52) U.S. Cl.
CPC ....... *H04S 2400/01* (2013.01); *H04S 2400/03* (2013.01)

(58) Field of Classification Search
USPC ............. 348/578; 370/347; 375/240.18, 241; 381/22, 119, 303, 307; 455/3.06; 704/225, 226, 500, 501; 709/219, 220; 713/168; 360/15; 707/100; 715/847; 725/32, 100
See application file for complete search history.

(56) References Cited

U.S. PATENT DOCUMENTS 6,311,155 B1 * 10/2001 Vaudrey ........... G11B 20/00992 381/10
7,199,836 B1 * 4/2007 Eleftheriadis .... H04N 21/23412 345/630
8,948,406 B2 * 2/2015 Lee ....................... G10L 19/008 381/22
2003/0172132 A1 * 9/2003 Lin .................... H04N 7/17318 709/219
2005/0182772 A1 * 8/2005 Mital ................ G06F 17/30569
2007/0297519 A1 * 12/2007 Thompson ............ G10L 19/008 375/241
2008/0232617 A1 * 9/2008 Goodwin .............. G10L 19/008 381/307
2008/0274687 A1 * 11/2008 Roberts .................. G06Q 30/02 455/3.06
2009/0177479 A1 * 7/2009 Yoon ..................... G10L 19/008 704/500
2009/0216542 A1 * 8/2009 Pang ..................... G10L 19/008 704/500
2010/0017003 A1 1/2010 Oh et al.
2010/0077212 A1 * 3/2010 McReynolds ........... G06F 21/10 713/168
2010/0215195 A1 * 8/2010 Harma .................... H04S 1/007 381/119
2011/0002393 A1 * 1/2011 Suzuki .................. G10L 19/008 375/240.18
2011/0002469 A1 * 1/2011 Ojala ........................ H04S 7/30 381/22
2011/0022402 A1 * 1/2011 Engdegard ................ H04S 7/30 704/501
2011/0085670 A1 * 4/2011 Pang ..................... G10L 19/008 381/22
2012/0101608 A1 4/2012 Jang et al.
2013/0132098 A1 5/2013 Beack et al.
2013/0239137 A1 * 9/2013 Ha ................... H04N 21/23608 725/32
2013/0239156 A1 * 9/2013 Ha ....................... H04N 21/234 725/100
2014/0133683 A1 5/2014 Robinson et al.
2014/0244809 A1 * 8/2014 Kang .................. H04L 67/2823 709/220
2016/0088416 A1 * 3/2016 Yoo ....................... G10L 19/173 381/303

* cited by examiner

200

10.2

| Down-Mix layout | Format conversion scheme |
| --- | --- |
| 10.2→7.1   | L=a*L+c*LH<br>R=a*R+c*RH<br>C=a*C<br>LS=a*LS<br>RS=a*RS<br>$LB=a*LB+c*\frac{1}{\sqrt{2}}CH$<br>$RB=a*RB+c*\frac{1}{\sqrt{2}}CH$<br>LFE=k*LFE1+l*LFE2 |
| 10.2→5.1   | L=a*L+c*LH<br>R=a*R+c*RH<br>C=a*C<br>$LS=a*(LB+LS)+c*\frac{1}{\sqrt{2}}CH$<br>$RS=a*(RB+RS)+c*\frac{1}{\sqrt{2}}CH$<br>LFE=k*LFE1+l*LFE2 |

AUDIO METADATA PROVIDING APPARATUS AND METHOD, AND MULTICHANNEL AUDIO DATA PLAYBACK APPARATUS AND METHOD TO SUPPORT DYNAMIC FORMAT CONVERSION

CROSS-REFERENCE TO RELATED APPLICATION(S)

This application claims the benefit under 35 USC 119(a) of Korean Patent Application No. 10-2014-0127751 and of Korean Patent Application No. 10-2015-0059445, respectively filed on Sep. 24, 2014 and Apr. 28, 2015, in the Korean Intellectual Property Office, the entire disclosures of which are incorporated herein by reference for all purposes.

BACKGROUND

1. Field

The following description relates to a multichannel audio data playback method, and more particularly, to a method of converting a format of multichannel audio data into various formats.

2. Description of Related Art

While a next generation content playback environment, for example a three dimensional (3D) television (TV), a 3D cinema or an ultra-high definition (UHD) TV, continues to be developed, an audio playback environment is rapidly changing to a sound playback environment using multichannel loudspeakers.

After 5.1 channel systems as surround sound systems for cinemas or HDTVs, various multichannel audio systems including upstream channels have been introduced. Recently, in an International Telecommunication Union (ITU) Radiocommunication Sector (ITU-R), a Recommendation BS.2051 has been established and accordingly, a total of eight multichannel formats including, for example, a 10.2 channel, a 13.1 channel or a 22.2 channel have been defined as an advanced sound system. Therefore, a possibility to produce audio content based on various formats greatly increases.

In the above environment, because content produced based on a single format is highly likely to be played back in another format, an appropriate content format conversion method may be required. In a related art, a multichannel audio format of content has been uniformly converted into a new multichannel audio format set in a playback environment. However, the above scheme according to the related art has disadvantages in that an authoring intention of a content author may be damaged and in that an unintended conversion may be performed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present invention provides an audio metadata providing apparatus and method to provide a dynamic format conversion scheme of converting a format of multichannel audio data into various formats to completely maintain an authoring intention of an author of the multichannel audio data, and a method and apparatus for converting the format based on the dynamic format conversion scheme and playing back the multichannel audio data, and a recording medium on which the dynamic format conversion scheme is recorded.

Another aspect of the present invention provides an audio metadata providing apparatus and method for generating audio metadata including dynamic format conversion information used to convert a first format set by an author of multichannel audio data into a second format that is based on a playback environment of the multichannel audio data.

Still another aspect of the present invention provides a multichannel audio data playback apparatus and method for identifying multichannel audio data and audio metadata including dynamic format conversion information, converting a format of the multichannel audio data from a first format into a second format, and playing back the multichannel audio data.

Yet another aspect of the present invention provides a non-transitory computer readable recording medium to store multichannel audio data and audio metadata including dynamic format conversion information.

In one general aspect, there is provided an audio metadata providing apparatus including a conversion information identifier configured to identify dynamic format conversion information on a conversion of a format of multichannel audio data from a first format to a second format, the first format being set by an author of the multichannel audio data and the second format being based on a playback environment of the multichannel audio data, and an audio metadata generator configured to generate audio metadata including the identified dynamic format conversion information.

The dynamic format conversion information may include information about a plurality of format conversion schemes of converting the first format into the second format, and each of the plurality of format conversion schemes may be set for a corresponding playback period of the multichannel audio data.

Playback periods of the multichannel audio data may have the same playback length or different playback lengths.

The playback environment of the multichannel audio data may be determined based on a layout of speakers through which the multichannel audio data is played back.

Each of the plurality of format conversion schemes may include a matrix to convert the first format into the second format.

In the dynamic format conversion information, different format conversion schemes may be set for each of the playback periods, or a single format conversion scheme may be set to a portion of the playback periods.

The audio metadata generator may be configured to generate audio metadata including a plurality of pieces of dynamic format conversion information corresponding to a plurality of second formats.

In another general aspect, there is provided a multichannel audio data playback apparatus including a data identifier configured to identify dynamic format conversion information on a conversion of a format of multichannel audio data from a first format to a second format from audio metadata and the multichannel audio data, the multichannel audio data being generated based on the first format, the first format being set by an author of the multichannel audio data and the second format being based on a playback environment of the multichannel audio data, an audio data converter configured to convert the first format of the multichannel audio data into the second format based on the dynamic format conversion information, and an audio data player configured to play back the multichannel audio data in the second format.

Playback periods of the multichannel audio data may have the same playback length or different playback lengths.

In the dynamic format conversion information, different format conversion schemes may be set for each of the playback periods, or a single format conversion scheme may be set to a portion of the playback periods.

The playback environment of the multichannel audio data may be determined based on a layout of speakers through which the multichannel audio data is played back.

In still another general aspect, there is provided an audio metadata providing method including identifying dynamic format conversion information on a conversion of a format of multichannel audio data from a first format to a second format, the first format being set by an author of the multichannel audio data and the second format being based on a playback environment of the multichannel audio data, and generating audio metadata including the identified dynamic format conversion information.

Playback periods of the multichannel audio data in which a plurality of format conversion schemes are set may have the same playback length or different playback lengths.

The playback environment of the multichannel audio data may be determined based on a layout of speakers through which the multichannel audio data is played back.

Each of the plurality of format conversion schemes may include a matrix to convert the first format into the second format.

In the dynamic format conversion information, different format conversion schemes may be set for each of the playback periods, or a single format conversion scheme may be set to a portion of the playback periods.

The generating may include generating audio metadata including a plurality of pieces of dynamic format conversion information corresponding to a plurality of second formats.

In a further general aspect, there is provided a multichannel audio data playback method including identifying dynamic format conversion information on a conversion of a format of multichannel audio data from a first format to a second format from audio metadata and the multichannel audio data, the multichannel audio data being generated based on the first format, the first format being set by an author of the multichannel audio data and the second format being based on a playback environment of the multichannel audio data, converting the first format of the multichannel audio data into the second format based on the dynamic format conversion information, and playing back the multichannel audio data in the second format.

Playback periods of the multichannel audio data in which a plurality of format conversion schemes are set may have the same playback length or different playback lengths.

In the dynamic format conversion information, different format conversion schemes may be set for each of the playback periods, or a single format conversion scheme may be set to a portion of the playback periods.

The playback environment of the multichannel audio data may be determined based on a layout of speakers through which the multichannel audio data is played back.

Each of the plurality of format conversion schemes may include a matrix to convert the first format into the second format.

The converting may further comprise applying a matrix based on one of the format conversion schemes to the first format of the multichannel audio data.

In still another general aspect, there is provided a non-transitory computer readable recording medium that stores multichannel audio data associated with at least one channel and audio metadata including dynamic format conversion information on a conversion of a format of the multichannel audio data from a first format to a second format, the first format being set by an author of the multichannel audio data and the second format being based on a playback environment of the multichannel audio data.

Other features and aspects will be apparent from the following detailed description, the drawings, and the claims.

Figure 1:
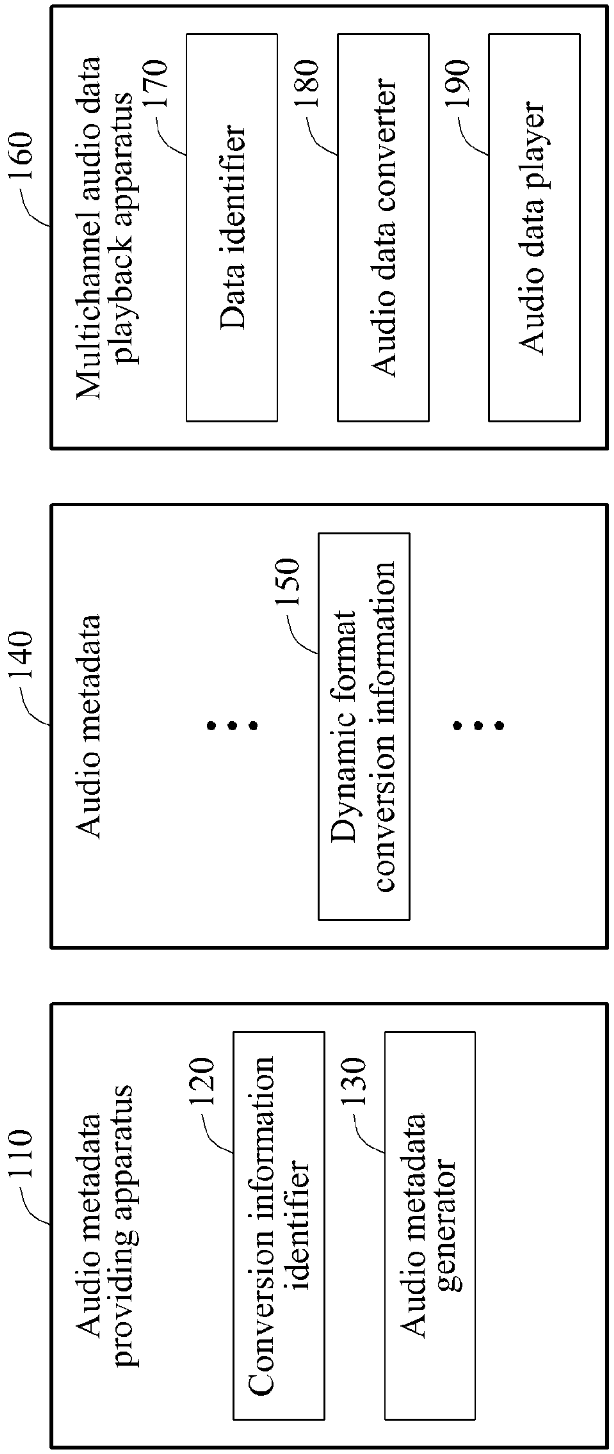
FIG. 1 illustrates an example of an audio metadata providing apparatus, an example of audio metadata, and an example of a multichannel audio data playback apparatus in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates an audio metadata providing apparatus 110, audio metadata 140 and a multichannel audio data playback apparatus 160 in accordance with an embodiment.

Referring to FIG. 1, the audio metadata providing apparatus 110 includes a conversion information identifier 120 and an audio metadata generator 130. The conversion information identifier 120 identifies dynamic format conversion information. The audio metadata generator 130 generates the audio metadata 140 including the identified dynamic format conversion information. The dynamic format conversion information includes information about a plurality of format conversion schemes of converting a format of multichannel audio data from a first format into a second format. In the present disclosure, the first format refers to a format set by an author of the multichannel audio data, and the second format refers to a format based on a playback environment of the multichannel audio data. Each of the format conversion schemes may be set for a corresponding playback period of the multichannel audio data.

In an example, the conversion information identifier 120 identifies dynamic format conversion information from an author of multichannel audio data. In another example, the conversion information identifier 120 identifies a plurality of pieces of dynamic format conversion information from audio metadata.

The audio metadata generator 130 generates audio metadata based on the dynamic format conversion information identified by the conversion information identifier 120. The audio metadata generator 130 includes a plurality of pieces of identified dynamic format conversion information in the audio metadata. In an example, the audio metadata generator 130 includes each of format conversion schemes in the dynamic format conversion information in the form of a matrix in the audio metadata. In another example, the audio metadata generator 130 includes, in the audio metadata, information generally included in audio metadata, together with the identified dynamic format conversion information. The audio metadata generally includes, for example, information on an author, an album title or a release year.

For example, the audio metadata providing apparatus 110 may be included as a component in a multichannel audio data providing apparatus.

The audio metadata 140 including dynamic format conversion information 150 is provided from the audio metadata providing apparatus 110. In an example, the audio metadata 140 includes information generally included in metadata as well as the dynamic format conversion information 150. In another example, the audio metadata 140 is provided together with multichannel audio data. In still another example, the audio metadata 140 is transmitted to the multichannel audio data playback apparatus 160 in real time, or is transmitted in advance to the multichannel audio data playback apparatus 160 and stored in a storage medium, for example a buffer or a memory, of the multichannel audio data playback apparatus 160. The audio metadata 140 is also stored in an optical recording medium, for example, a compact disc (CD)-read only memory (ROM), a CD-rewritable (RW), a digital versatile disc-recordable (DVD-R) or a DVD-RW, and is distributed.

The multichannel audio data playback apparatus 160 converts a format of multichannel audio data based on dynamic format conversion information, and plays back the multichannel audio data. The multichannel audio data playback apparatus 160 includes a data identifier 170, an audio data converter 180 and an audio data player 190. The data identifier 170 identifies dynamic format conversion information. The audio data converter 180 converts the format of the multichannel audio data based on the identified dynamic format conversion information. The audio data player 190 plays back the multichannel audio data in the converted format.

The data identifier 170 identifies dynamic format conversion information corresponding to the second format from the audio metadata 140. The playback environment of the multichannel audio data is determined based on a layout of speakers through which the multichannel audio data is played back. For example, the data identifier 170 may select and identify dynamic format conversion information corresponding to the second format from at least one piece of dynamic format conversion information recorded in audio metadata.

The audio data converter 180 converts the format of the multichannel audio data from the first format to the second format, based on the identified dynamic format conversion information. The dynamic format conversion information includes information about a plurality of format conversion schemes of converting the first format into the second format, and each of the format conversion schemes is set for a corresponding playback period of the multichannel audio data.

The audio data converter 180 identifies a playback period including a playback time from the dynamic format conversion information based on the playback time, identifies a format conversion scheme set to the playback period from the dynamic format conversion information, and converts the first format into the second format. Playback periods of the multichannel audio data may have the same playback length or different playback lengths. To convert the format, the audio data converter 180 may use different format conversion schemes for each of the playback periods, or may repeatedly use one of the format conversion schemes for a portion of the playback periods, based on the dynamic format conversion information.

The audio data player 190 plays back multichannel audio data in the second format. As described above, the second format is based on the playback environment of the multichannel audio data, and the playback environment is determined based on a layout of speakers through which the multichannel audio data is played back. The audio data player 190 includes at least one outputter of a speaker. The audio data player 190 outputs audio data using a speaker corresponding to each channel of the multichannel audio data with the second format.

The audio data player 190 recognizes a number of speakers connected to the outputter, and identifies the playback environment of the multichannel audio data. In addition, the audio data player 190 identifies a position of each of the speakers as well as the number of the speakers, or identifies a playback environment in response to an input of information on the playback environment being received from a user.

Figure 2:
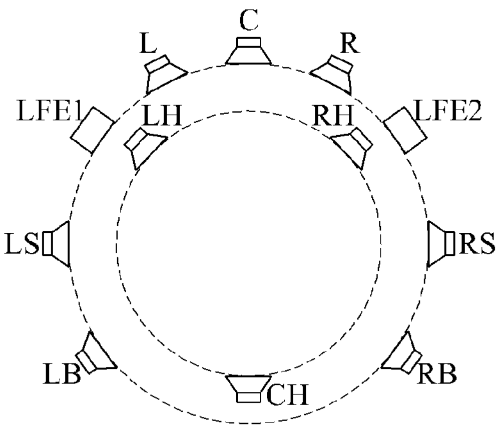
FIG. 2 illustrates an example of uniformly converting a format of multichannel audio data in accordance with an embodiment.
Figure 2:
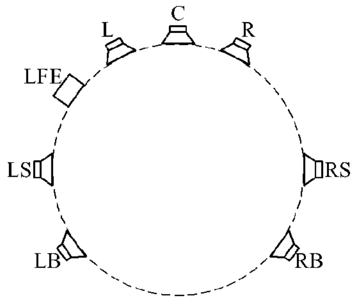
Figure 2:
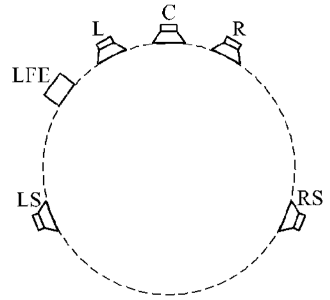

FIG. 2 illustrates an example of uniformly converting a format of multichannel audio data in accordance with an embodiment.

Multichannel audio data is generated based on a first format that is a format of the multichannel audio data and that is set by an author of the multichannel audio data. In an apparatus for playing back multichannel audio data, a second format is set as a format of the multichannel audio data, and is based on a playback environment of the multichannel audio data. Because the playback environment of the multichannel audio data is determined based on a layout of speakers through which the multichannel audio data is played back, the second format may be different from the first format. When the second format is different from the first format, an audio data converter of a multichannel audio data playback apparatus may perform a conversion based on a uniform format conversion scheme 200.

For example, in a left side of FIG. 2, a 10.2-channel format is assumed as a first format. In this example, when a 5.1-channel format is set as a second format, a front left speaker L of a listener is determined by a linear combination of a front left speaker L and an upper left speaker LH of the first format. When a 7.1-channel format is set as the second format, a back right speaker RB is determined by a linear combination of a central speaker CH and a back right speaker RB of the first format.

Based on the uniform format conversion scheme 200, a format conversion scheme is given as a linear combination of channels and accordingly, a nonlinear conversion is impossible. Also, format conversion schemes remain unchanged for each playback period. In accordance with an embodiment, dynamic format conversion information including information about at least one format conversion scheme set for each of playback periods of multichannel audio data is provided. Also, a format conversion scheme to support a nonlinear conversion of the first format into the second format is provided.

Figure 3:
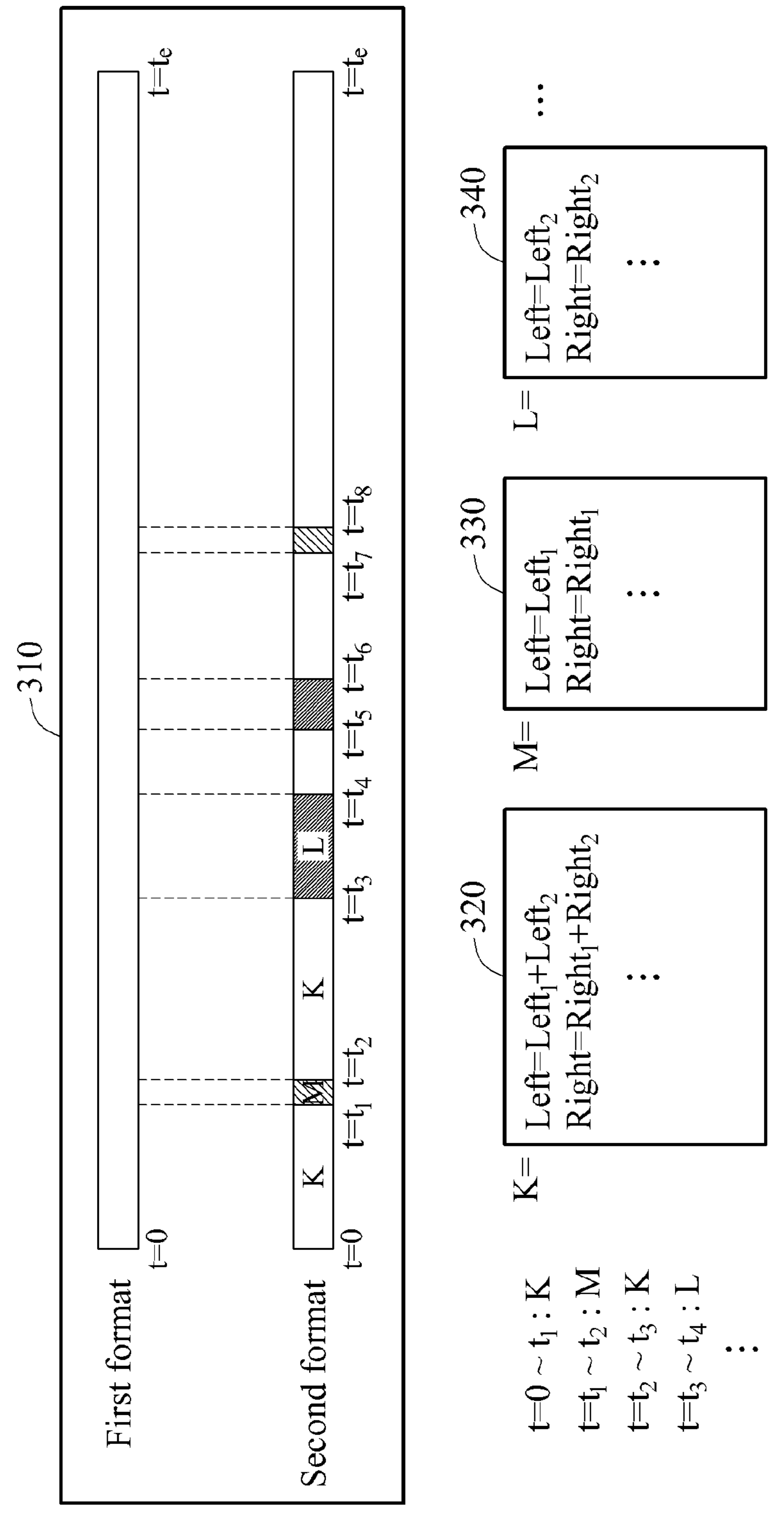
FIG. 3 illustrates an example of dynamic format conversion information used to convert a format of multichannel audio data in accordance with an embodiment.

FIG. 3 illustrates an example of dynamic format conversion information 310 used to convert a format of multichannel audio data in accordance with an embodiment.

Referring to FIG. 3, the dynamic format conversion information 310 includes information about a plurality of format conversion schemes, for example, format conversion schemes K 320, M 330 and L 340. The format conversion schemes are used to convert the format of the multichannel audio data from a first format set by an author of the multichannel audio data to a second format based on a playback environment of the multichannel audio data, and are set for each of playback periods of the multichannel audio data.

Each of the format conversion schemes converts the format into the same format, for example, the second format, however, the format conversion schemes are different from each other. Referring to FIG. 3, the format conversion scheme K 320 determines output data of a left speaker Left of the second format by a linear combination of a plurality of left speakers of the first format, for example left speakers $Left_1$ and $Left_2$. The format conversion scheme M 330 determines output data of the left speaker Left of the second format using the left speaker $Left_1$ of the first format. Each of the format conversion schemes may include a nonlinear conversion.

A multichannel audio data playback apparatus according to an embodiment identifies the format conversion schemes set corresponding playback period from dynamic format conversion information, and performs a conversion. Referring to FIG. 3, in a playback period of "0" to "$t_1$," the multichannel audio data playback apparatus converts the format of the multichannel audio data using the format conversion scheme K 320. In a playback period of "$t_1$" to "$t_2$," the multichannel audio data playback apparatus converts the format of the multichannel audio data using the format conversion scheme M 330. Similarly, in a playback period of "$t_3$" to "$t_4$," the multichannel audio data playback apparatus converts the format of the multichannel audio data using the format conversion scheme L 340. In playback periods after "$t_4$," the same process is repeated.

In the dynamic format conversion information 310, different format conversion schemes may be set for each of the playback periods, or a single format conversion scheme may be set to a portion of the playback periods. The format conversion scheme K 320 is set to a playback period of "$t_2$" to "$t_3$" as well as the playback period of "0" to "$t_1$." In accordance with an embodiment, a format conversion scheme may include at least one of a nonlinear conversion, a uniform format conversion scheme and a conversion by a linear combination.

The playback periods may have the same playback length or different playback lengths. As shown in FIG. 3, a playback length of the playback period of "$t_1$" to "$t_2$" is equal to a playback length of a playback period of "$t_7$" to "$t_8$."

Figure 4:
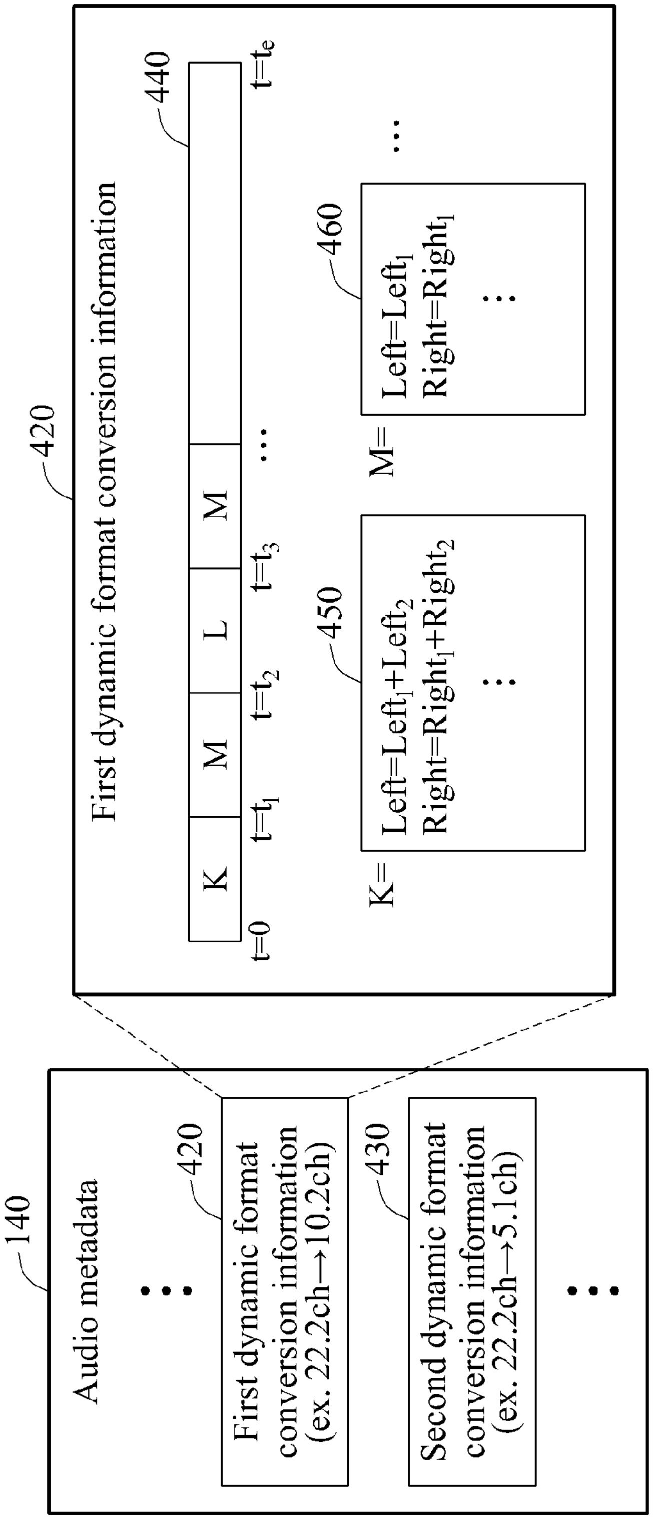
FIG. 4 illustrates an example of audio metadata including at least one piece of dynamic format conversion information in accordance with an embodiment.

FIG. 4 illustrates an example of audio metadata 140 including at least one piece of dynamic format conversion information in accordance with an embodiment.

Referring to FIG. 4, due to various playback environments of multichannel audio data, the audio metadata 140 includes at least one piece of dynamic format conversion information, for example, first dynamic format conversion information 420 and second dynamic format conversion information 430. The multichannel audio data playback apparatus 160 selects dynamic format conversion information corresponding to a second format that is based on a playback environment of multichannel audio data, and converts a format of the multichannel audio data. The playback environment is determined based on a layout of speakers through which the multichannel audio data is played back.

For example, in FIG. 4, a 22.2-channel format and a 10.2-channel format are set as a first format and a second format, respectively. In this example, the data identifier 170 of the multichannel audio data playback apparatus 160 identifies the first dynamic format conversion information 420 corresponding to the second format between the first dynamic format conversion information 420 and the second dynamic format conversion information 430. In another example, when a 5.1-channel format is set as the second format, the data identifier 170 identifies the second dynamic format conversion information 430.

When the 10.2-channel format is set as the second format, the audio data converter 180 converts the format of the multichannel audio data based on the identified first dynamic format conversion information 420. In other words, based on a plurality of format conversion schemes 440 set for each of playback periods, the audio data converter 180 converts the format of the multichannel audio data using a format conversion scheme K 450 in a playback period of "0" to "$t_1$," and converts the format of the multichannel audio data using a format conversion scheme M 460 in a playback period of "$t_1$" to "$t_2$." In accordance with an embodiment, in dynamic format conversion information, different format conversion schemes may be set for each of playback periods, or a single format conversion scheme may be set to a portion of the playback periods. In addition, the playback periods may have the same playback length or different playback lengths. The format conversion scheme K 450 is used in the playback period of "0" to "$t_1$" as shown in FIG. 4, and may be repeatedly used in a playback period after the playback period of "0" to "$t_1$." The playback period of "0" to "$t_1$" and the playback period of "$t_1$" to "$t_2$" may have the same playback length or different playback lengths.

Figure 5:
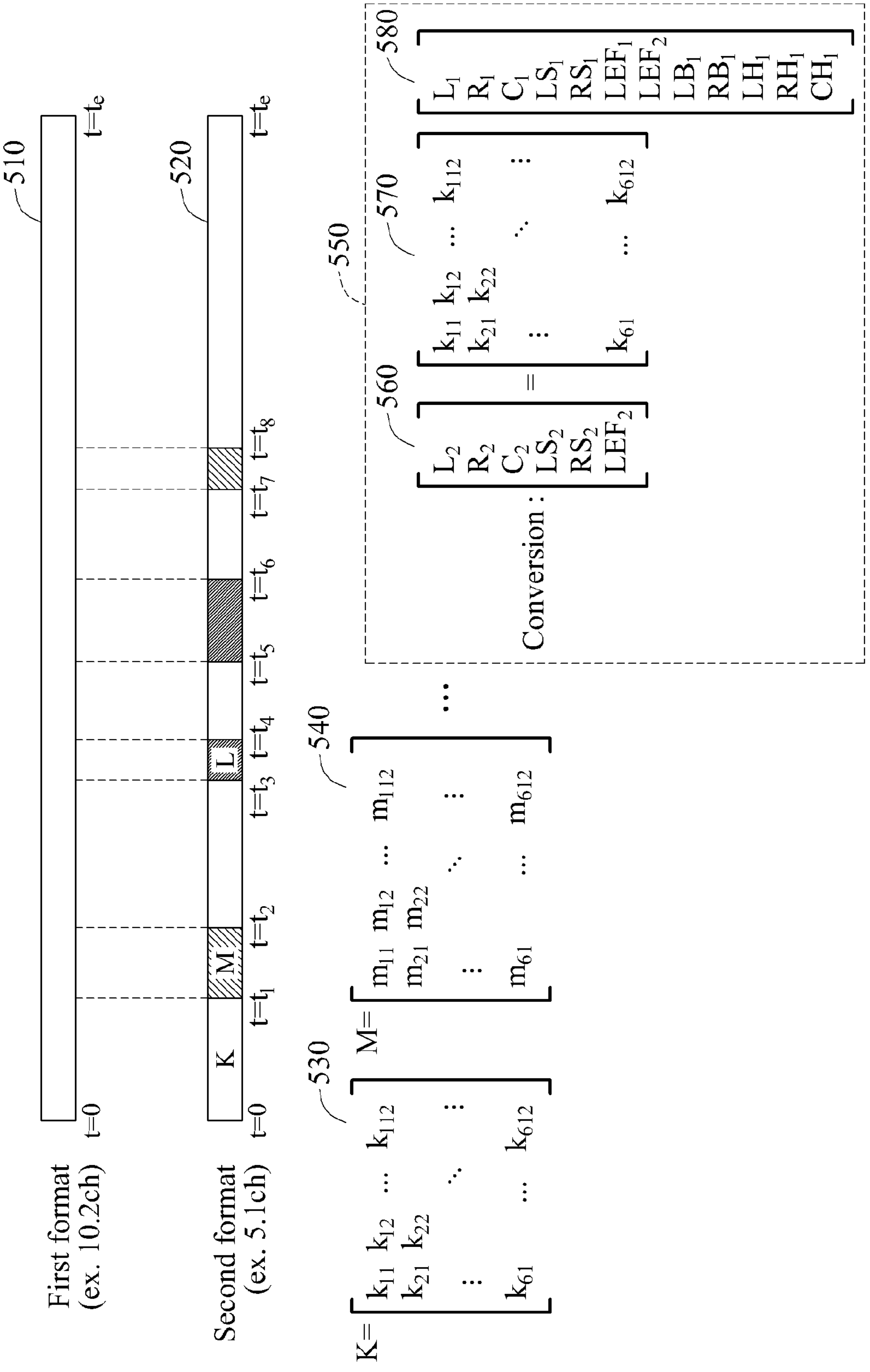
FIG. 5 illustrates an example of converting a format of multichannel audio data based on a matrix scheme in accordance with an embodiment.

FIG. 5 illustrates an example of converting a format of multichannel audio data based on a matrix scheme in accordance with an embodiment.

Referring to FIG. 5, dynamic format conversion information 520 includes information about a plurality of format conversion schemes of converting a format of multichannel audio data 510 from a first format to a second format. Each of the plurality of format conversion schemes is set for a corresponding playback period of the multichannel audio data 510.

Referring to FIG. 5, format conversion schemes in dynamic format conversion information is stored as conversion matrices, for example conversion matrices 530 and 540, respectively. The conversion matrices are used to convert a first format set by an author of the multichannel audio data into a second format that is based on a playback environment of the multichannel audio data. An audio data converter applies a first format channel matrix to a conversion matrix and outputs a second format channel matrix, to convert the first format into the second format.

For example, referring to FIG. 5, the author of the multichannel audio data generates the multichannel audio data in a 10.2-channel format as a first format, and the playback environment of the multichannel audio data corresponds to a 5.1-channel format as a second format. In this example, in a format conversion 550, the audio data converter converts the format by applying a first format channel matrix 580 to a conversion matrix 570 and outputting a second format channel matrix 560. Each of elements of the first format channel matrix 580 corresponds to each channel Because the 10.2-channel format has "12" channels and the 5.1-channel format has "6" channels, each of the conversion matrices 530 and 540 including information on the format conversion schemes has "6" rows and "12" columns.

Also, the audio data converter changes the conversion matrix 570 based on format conversion schemes set for each of playback periods, and converts the format. For example, in dynamic format conversion information 520, a format conversion scheme K is set in a playback period of "0" to "$t_1$." In this example, the audio data converter sets the conversion matrix 570 as the conversion matrix 530 corresponding to the format conversion scheme K, and converts the format. A format conversion scheme M is set in a playback period of "$t_1$" to "$t_2$," and the audio data converter sets the conversion matrix 570 as the conversion matrix 540 corresponding to the format conversion scheme M, and converts the format.

Figure 6:
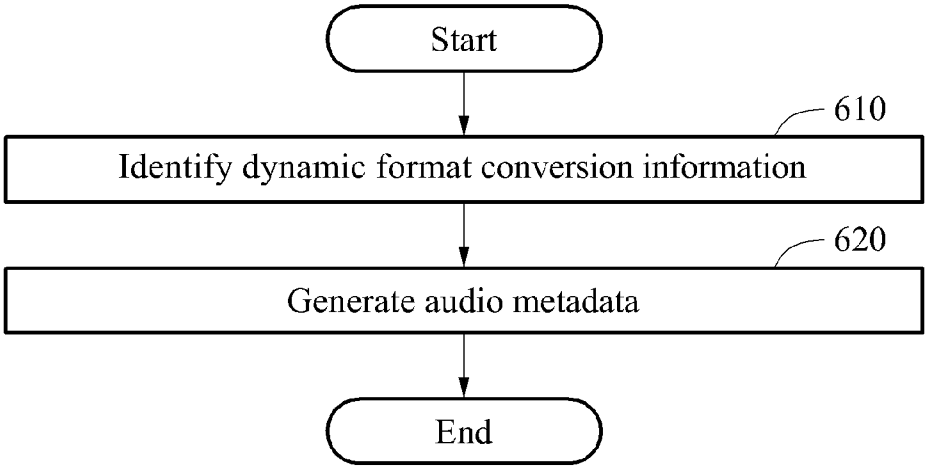
FIG. 6 illustrates an example of a process by which an audio metadata providing apparatus provides audio metadata including dynamic format conversion information in accordance with an embodiment.

FIG. 6 illustrates an example of a process by which an audio metadata providing apparatus provides audio metadata including dynamic format conversion information in accordance with an embodiment.

Referring to FIG. 6, in operation 610, the audio metadata providing apparatus identifies dynamic format conversion information. The dynamic format conversion information includes information about a plurality of format conversion schemes of converting a format of multichannel audio data from a first format into a second format. Each of the format conversion schemes is set for a corresponding playback period of the multichannel audio data. In an example, the audio metadata providing apparatus identifies dynamic format conversion information from an author of multichannel audio data. In another example, the audio metadata providing apparatus identifies a plurality of pieces of dynamic format conversion information from audio metadata.

In operation 620, the audio metadata providing apparatus generates audio metadata including the identified dynamic format conversion information. The audio metadata includes information generally included in the audio metadata as well as the identified dynamic format conversion information. The audio metadata generally includes, for example, information on an author, an album title or a release year. In an example, the audio metadata providing apparatus includes a plurality of pieces of dynamic format conversion information in the audio metadata. In another example, the audio metadata providing apparatus records each of format conversion schemes in the dynamic format conversion information in the form of a matrix (for example, the conversion matrices 530 and 540 of FIG. 5) in the audio metadata.

Figure 7:
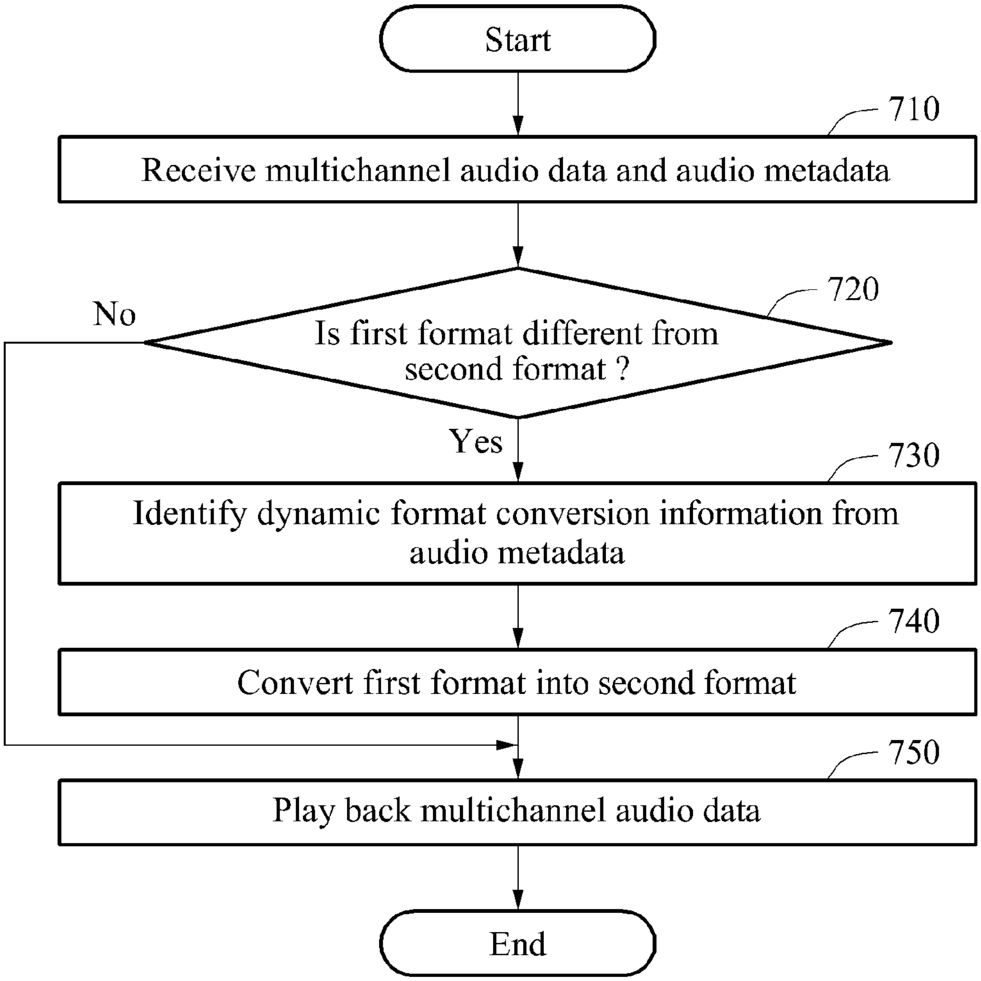
FIG. 7 illustrates an example of a process by which a multichannel audio data playback apparatus converts a format of multichannel audio data and plays back the multichannel audio data in accordance with an embodiment.

FIG. 7 illustrates an example of a process by which a multichannel audio data playback apparatus converts a format of multichannel audio data and plays back the multichannel audio data in accordance with an embodiment.

Referring to FIG. 7, in operation 710, the multichannel audio data playback apparatus receives multichannel audio data and audio metadata. The audio metadata may be provided separately or together with the multichannel audio data. The audio metadata may be received in real time by the multichannel audio data playback apparatus, or may be received in advance by the multichannel audio data playback apparatus and stored in a storage medium, for example a buffer or a memory, of the multichannel audio data playback apparatus. The audio metadata may be also stored in an optical recording medium, for example, a CD-ROM, a CD-RW, a DVD-R or a DVD-RW, and may be received.

When a first format set by an author of the multichannel audio data is different from a second format based on a playback environment of the multichannel audio data in operation 720, the multichannel audio data playback apparatus identifies dynamic format conversion information from the audio metadata in operation 730. In an example, the audio metadata includes at least one piece of dynamic format conversion information. In this example, the multichannel audio data playback apparatus identifies dynamic format conversion information corresponding to the second format that is a format of the multichannel audio data playback apparatus. The playback environment of the multichannel audio data is determined based on a layout of speakers through which the multichannel audio data is played back.

The identified dynamic format conversion information includes information about a plurality of format conversion schemes of converting the first format into the second format, and each of the format conversion schemes is set for a corresponding playback period of the multichannel audio data. Playback periods of the multichannel audio data may have the same playback length or different playback lengths. In the dynamic format conversion information, different format conversion schemes may be set for each of the playback periods, or a single format conversion scheme may be set to a portion of the playback periods.

In operation 740, the multichannel audio data playback apparatus converts the first format into the second format based on the identified dynamic format conversion information. The playback periods may have the same playback length or different playback lengths based on the dynamic format conversion information. Different format conversion schemes may be set for each of the playback periods, or a single format conversion scheme may be set to a portion of the playback periods.

In operation 750, the multichannel audio data playback apparatus plays back the multichannel audio data in the second format. The multichannel audio data playback apparatus outputs audio data using a speaker corresponding to each channel of the multichannel audio data with the second format. When the first format is the same as the second format, the multichannel audio data playback apparatus plays back the multichannel audio data, instead of converting the first format into the second format.

According to embodiments, it is possible to provide a dynamic format conversion scheme of converting a format of multichannel audio data into various formats to completely maintain an authoring intention of an author of the multichannel audio data, to convert the format based on the dynamic format conversion scheme, and to play back the multichannel audio data. The dynamic format conversion scheme may be recorded in a recording medium.

In addition, according to embodiments, it is possible to generate audio metadata including dynamic format conversion information used to convert a first format set by an author of multichannel audio data into a second format that is based on a playback environment of the multichannel audio data.

Moreover, according to embodiments, it is possible to identify multichannel audio data and audio metadata including dynamic format conversion information, to convert a format of the multichannel audio data from a first format to a second format, and to play back the multichannel audio data.

Furthermore, according to embodiments, it is possible to store multichannel audio data and audio metadata including dynamic format conversion information in a non-transitory computer readable recording medium.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include ROMs, random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An audio metadata providing apparatus comprising:

a processor configure to identify dynamic format conversion information on a conversion of a format of multichannel audio data from a first format to a second format, the first format being set by an author of the multichannel audio data and the second format being based on a playback environment of the multichannel audio data, and generate audio metadata comprising the identified dynamic format conversion information, wherein the dynamic format conversion information comprises information about format conversion schemes to convert the first format into the second format, wherein the playback environment is determined based on a layout of speakers through which the multichannel audio data is played back, and wherein the layout is associated with a position of each of the speakers and a number of the speakers.

2. The audio metadata providing apparatus of claim 1, wherein playback periods of the multichannel audio data have the same playback length or different playback lengths.

3. The audio metadata providing apparatus of claim 1, wherein each of the format conversion schemes comprises a matrix to convert the first format into the second format.

4. The audio metadata providing apparatus of claim 1, wherein in the dynamic format conversion information, different format conversion schemes are set for each of playback periods of the multichannel audio data, or a single format conversion scheme is set to a portion of the playback periods.

5. The audio metadata providing apparatus of claim 1, wherein the second format comprises second formats, and the processor is configured to generate audio metadata comprising pieces of dynamic format conversion information corresponding to the second formats.

6. The audio metadata providing apparatus of claim 1, wherein the format conversion schemes comprise information describing how audio channels of the first format are used to produce audio channels in the second format.

7. The audio metadata providing apparatus of claim 1, wherein the first format comprises a first number of audio channels and the second format comprises a second number of audio channels.

8. An audio metadata providing method performed by a processor, the method comprising:

identifying dynamic format conversion information on a conversion of a format of multichannel audio data from a first format to a second format, the first format being set by an author of the multichannel audio data and the second format being based on a playback environment of the multichannel audio data; and generating audio metadata comprising the identified dynamic format conversion information, wherein the dynamic format conversion information comprises information about a format conversion schemes to convert the first format into the second format, wherein the playback environment is determined based on a layout of speakers through which the multichannel audio data is played back, and wherein the layout is associated with a position of each of the speakers and a number of the speakers.

9. The audio metadata providing method of claim 8, wherein playback periods of the multichannel audio data have the same playback length or different playback lengths.

10. The audio metadata providing method of claim 8, wherein each of the format conversion schemes comprises a matrix to convert the first format into the second format.

11. The audio metadata providing method of claim 8, wherein in the dynamic format conversion information, different format conversion schemes are set for each of playback periods of the multichannel audio data, or a single format conversion scheme is set to a portion of the playback periods.

12. The audio metadata providing method of claim 8, wherein the second format comprises second formats, and wherein the generating comprises generating audio metadata comprising pieces of dynamic format conversion information corresponding to the second formats.

13. A multichannel audio data playback method performed by a processor, the method comprising:

identifying dynamic format conversion information on a conversion of a format of multichannel audio data from a first format to a second format from audio metadata and the multichannel audio data, the multichannel audio data being generated based on the first format, the first format being set by an author of the multichannel audio data and the second format being based on a playback environment of the multichannel audio data;

converting the first format of the multichannel audio data into the second format based on the dynamic format conversion information; and playing back the multichannel audio data in the second format, wherein the dynamic format conversion information comprises information about format conversion schemes to convert the first format into the second format, wherein the playback environment is determined based on a layout of speakers through which the multichannel audio data is played back, and wherein the layout is associated with a position of each of the speakers and a number of the speakers.

14. The multichannel audio data playback method of claim 13, wherein playback periods of the multichannel audio data have the same playback length or different playback lengths.

15. The multichannel audio data playback method of claim 13, wherein in the dynamic format conversion information, different format conversion schemes are set for each of playback periods of the multichannel audio data, or a single format conversion scheme is set to a portion of the playback periods.

16. The multichannel audio data playback method of claim 13, wherein each of the format conversion schemes comprises a matrix to convert the first format into the second format.

17. The multichannel audio data playback method of claim 13, wherein the converting further comprises applying a matrix based on one of the format conversion schemes to the first format of the multichannel audio data.

* * * * *